United States Patent
Zhou et al.

(10) Patent No.: US 9,738,781 B2
(45) Date of Patent: Aug. 22, 2017

(54) BLENDS OF STYRENE-BUTADIENE BLOCK COPOLYMER WITH STYRENIC THERMOPLASTIC ELASTOMERS FOR TUBING APPLICATIONS

(71) Applicant: INEOS STYROLUTION GROUP GMBH, Frankfurt am Main (DE)

(72) Inventors: Jinping Joe Zhou, Bartlesville, OK (US); Jay M Chaffin, Bartlesville, OK (US); Charlie Rees, Copan, OK (US)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 14/844,039

(22) Filed: Sep. 3, 2015

(65) Prior Publication Data

US 2017/0066918 A1 Mar. 9, 2017

(51) Int. Cl.
*C08L 53/02* (2006.01)
*C08L 53/00* (2006.01)
*F16L 11/04* (2006.01)
*A61L 29/00* (2006.01)

(52) U.S. Cl.
CPC ............. *C08L 53/02* (2013.01); *C08L 53/00* (2013.01); *F16L 11/04* (2013.01); *C08L 2205/025* (2013.01); *C08L 2205/03* (2013.01); *C08L 2207/04* (2013.01)

(58) Field of Classification Search
CPC .... C08L 53/02; C08L 53/00; C08L 2205/025; C08L 2205/03; C08L 2207/04; A61L 29/00; F16L 11/04
USPC ........................................................ 524/505
See application file for complete search history.

(56) References Cited

U.S. PATENT DOCUMENTS

| | | |
|---|---|---|
| 3,639,517 A | 2/1972 | Kitchen et al. |
| 3,855,189 A | 12/1974 | Farrar et al. |
| 3,865,776 A | 2/1975 | Gergen |
| 4,048,254 A | 9/1977 | Hillier et al. |
| 4,067,942 A | 1/1978 | Wilson |
| 4,086,298 A | 4/1978 | Fahrbach et al. |
| 4,088,813 A | 5/1978 | Willis |
| 4,091,053 A | 5/1978 | Kitchen |
| 4,350,795 A | 9/1982 | Bohm et al. |
| 4,386,190 A | 5/1983 | Bailey |
| 4,403,074 A | 9/1983 | Moczygemba |
| 4,405,754 A | 9/1983 | Moczygemba et al. |
| 4,418,180 A | 11/1983 | Heinz et al. |
| 4,440,815 A | 4/1984 | Zomorodi et al. |
| 4,615,851 A | 10/1986 | Theodore et al. |
| H179 H | 12/1986 | Klingensmith et al. |
| 4,631,314 A | 12/1986 | Tung et al. |
| 4,704,434 A | 11/1987 | Kitchen et al. |
| 5,001,009 A | 3/1991 | Whitbourne |
| 5,130,377 A | 7/1992 | Trepka et al. |
| 5,198,495 A | 3/1993 | Fasulo et al. |
| 5,227,419 A | 7/1993 | Moczygemba et al. |
| 5,256,736 A | 10/1993 | Trepka et al. |
| 5,274,035 A | 12/1993 | Chundury |
| 5,290,875 A | 3/1994 | Moczygemba et al. |
| 5,319,033 A | 6/1994 | Trepka et al. |
| 5,331,048 A | 7/1994 | Hasselbring |
| 5,369,174 A | 11/1994 | Hasselbring |
| 5,393,838 A | 2/1995 | Moczygemba et al. |
| 5,399,628 A | 3/1995 | Moczygemba et al. |
| 5,436,298 A | 7/1995 | Moczygemba et al. |
| 5,438,103 A | 8/1995 | DePorter et al. |
| 5,545,690 A | 8/1996 | Trepka et al. |
| 5,587,425 A | 12/1996 | Moczygemba et al. |
| 5,705,569 A | 1/1998 | Moczygemba et al. |
| 5,854,353 A | 12/1998 | Knoll et al. |
| 5,885,530 A | 3/1999 | Babson et al. |
| 5,910,546 A | 6/1999 | Trepka et al. |
| 6,096,828 A | 8/2000 | DePorter et al. |
| 6,107,411 A | 8/2000 | Toya et al. |
| 6,197,889 B1 | 3/2001 | Knoll et al. |
| 6,238,408 B1 | 5/2001 | Kawabata et al. |
| 6,239,218 B1 | 5/2001 | Yonezawa et al. |
| 6,265,484 B1 | 7/2001 | Trepka et al. |
| 6,265,485 B1 | 7/2001 | Trepka et al. |
| 6,303,200 B1 | 10/2001 | Woo et al. |
| 6,420,486 B1 | 7/2002 | DePorter et al. |

(Continued)

FOREIGN PATENT DOCUMENTS

| | | |
|---|---|---|
| EP | 0 512 530 A1 | 11/1992 |
| EP | 0 553 689 A1 | 8/1993 |

(Continued)

OTHER PUBLICATIONS

Hsieh, Henry L., et al., "Kinetics of Alkyllithium Initiated Polymerizations", Rubber Chemistry and Technology, (1970), 43(1 ), pp. 22-73.

Kennedy et al., "Synthesis and Characterisation of Styrene Butadiene Styrene Based Grafted Copolymers for Use in Potential Biomedical Application"; Biomedical Engineering, Trends in Materials Science, Department of Polymer Engineering, Athlone Institute of Technology, Ireland, www.intechopen.com; (2001) pp. 465-488.

Kraus, Gerald, et al., "Morphology and Dynamic Viscoelastic behavior of blends of Styrene-Butadiene Block Copolymers", Adv. Chem. Ser., (1979), 176, pp. 277-292.

(Continued)

*Primary Examiner* — Ling Choi
*Assistant Examiner* — Ronald Grinsted
(74) *Attorney, Agent, or Firm* — J.A. Lindeman & Co., PLLC

(57) ABSTRACT

Polymer compositions containing conjugated diene monovinylarene block copolymers and styrenic thermoplastic elastomers are disclosed. These compositions can be used to produce tubing having superior kink resistance properties, and can be a replacement for flexible PVC in various end-use applications, such as in sheet products, film products, tubing products, and adhesive products.

14 Claims, 1 Drawing Sheet

(56) References Cited

U.S. PATENT DOCUMENTS

| | | |
|---|---|---|
| 6,444,755 B1 | 9/2002 | DePorter et al. |
| 6,521,712 B1 | 2/2003 | Knoll et al. |
| 6,548,181 B2 | 4/2003 | Beusen |
| 6,593,430 B1 | 7/2003 | Knoll et al. |
| 6,835,778 B2 | 12/2004 | Swisher et al. |
| 6,841,261 B2 | 1/2005 | Matsui et al. |
| 6,846,535 B2* | 1/2005 | De Groot ............ A61L 29/049 428/36.9 |
| 6,946,520 B2 | 9/2005 | Karande et al. |
| 6,977,105 B1 | 12/2005 | Fujieda et al. |
| 7,037,980 B2 | 5/2006 | Stacy et al. |
| 7,067,589 B2 | 6/2006 | Bening et al. |
| 7,093,599 B2 | 8/2006 | Chen |
| 7,138,456 B2 | 11/2006 | Bening et al. |
| 7,169,848 B2 | 1/2007 | Bening et al. |
| 7,169,850 B2 | 1/2007 | Handlin, Jr. et al. |
| 7,193,014 B2 | 3/2007 | Wilkey et al. |
| 7,250,129 B2 | 7/2007 | Williams et al. |
| 7,332,542 B2 | 2/2008 | Bening et al. |
| 7,700,688 B2 | 4/2010 | Uzee et al. |
| 7,737,216 B2 | 6/2010 | Brown et al. |
| 7,776,965 B2 | 8/2010 | Wilkey et al. |
| 7,858,693 B2 | 12/2010 | Wright et al. |
| 7,875,678 B2 | 1/2011 | Hanner et al. |
| 8,058,346 B2 | 11/2011 | Wilkey et al. |
| 8,236,894 B2 | 8/2012 | Brown et al. |
| 8,415,429 B2 | 4/2013 | Brown et al. |
| 8,735,491 B2 | 5/2014 | Kim et al. |
| 8,933,171 B2 | 1/2015 | Pettey et al. |
| 9,040,628 B2 | 5/2015 | Brown et al. |
| 9,174,377 B2 | 11/2015 | Pettey et al. |
| 2002/0061982 A1 | 5/2002 | Donald et al. |
| 2003/0004267 A1 | 1/2003 | Swisher et al. |
| 2003/0144418 A1 | 7/2003 | Donald et al. |
| 2004/0115381 A1 | 6/2004 | Harris et al. |
| 2006/0089457 A1 | 4/2006 | Hartsock et al. |
| 2006/0100386 A1 | 5/2006 | Wilkey et al. |
| 2006/0178485 A1 | 8/2006 | Shimakage et al. |
| 2006/0205874 A1* | 9/2006 | Uzee ..................... C08L 53/02 525/88 |
| 2006/0211818 A1 | 9/2006 | Kurimura et al. |
| 2006/0235118 A1 | 10/2006 | Selby et al. |
| 2006/0235188 A1 | 10/2006 | Weinhold et al. |
| 2007/0027257 A1 | 2/2007 | Kobashi et al. |
| 2007/0043168 A1 | 2/2007 | Montiel-Ortiz et al. |
| 2007/0093601 A1 | 4/2007 | Watanabe et al. |
| 2007/0173605 A1 | 7/2007 | Brown et al. |
| 2007/0225427 A1 | 9/2007 | Wright et al. |
| 2008/0215016 A1 | 9/2008 | Igarashi et al. |
| 2011/0098401 A1 | 4/2011 | Müller et al. |
| 2011/0251596 A1 | 10/2011 | Kim et al. |
| 2012/0219742 A1 | 8/2012 | Gravesen et al. |
| 2012/0270979 A1 | 10/2012 | Hsu et al. |
| 2013/0079471 A1 | 3/2013 | Brown et al. |
| 2014/0037880 A1 | 2/2014 | Siddhamalli et al. |
| 2016/0264705 A1 | 9/2016 | Zhou et al. |
| 2016/0264773 A1 | 9/2016 | Zhou et al. |

FOREIGN PATENT DOCUMENTS

| | | |
|---|---|---|
| EP | 0 603 852 A1 | 6/1994 |
| EP | 0 646 607 | 4/1995 |
| EP | 0 654 488 A1 | 5/1995 |
| EP | 0 761 704 A1 | 3/1997 |
| EP | 1 123 715 A2 | 8/2001 |
| EP | 1 605 002 A1 | 12/2005 |
| EP | 2 186 859 | 5/2010 |
| EP | 2 407 512 | 1/2012 |
| EP | 2 415 609 | 2/2012 |
| GB | 1 491 741 | 11/1977 |
| JP | 2006/083233 | 3/2006 |
| WO | WO 01/25303 | 4/2001 |
| WO | WO 01/94466 | 12/2001 |
| WO | WO 03/018685 | 3/2003 |
| WO | WO 2011/090759 | 7/2011 |
| WO | WO 2012/037462 | 3/2012 |

OTHER PUBLICATIONS

Knoll, Konrad, et al. "Styrolux and styroflex. From Transparent High Impact Polystyrene to New Thermoplastic Elastomers. Syntheses, Applications, and Blends with Other Styrene-Based Polymers", Macromolecular Symposia (1998), 132, pp. 231-243.

CEN European Standard, "Test methods for kinking of single lumen catheters and medical tubing," EN 13868 (2002), 13 pages.

U.S. Appl. No. 14/645,658, filed Mar. 12, 2015, entitled "Styrene-Butadiene Block Copolymers for Tubing Applications."

U.S. Appl. No. 14/645,841, filed Mar. 12, 2015, entitled "Methods for Controlling Hardness of Styrene-Butadiene Block Copolymers."

U.S. Appl. No. 14/857,875, filed Sep. 18, 2015, entitled "Styrene-Butadiene Block Copolymers With a Terminal Butadiene Block for Tubing Applications."

International Search Report and the Written Opinion of the International Searching Authority in PCT/US2016/021919 dated May 19, 2016, 8 pages.

International Search Report and the Written Opinion of the International Searching Authority in PCT/US2016/021948 dated Jun. 9, 2016, 8 pages.

International Search Report and the Written Opinion of the International Searching Authority in PCT/US2016/049898 dated Nov. 15, 2016, 8 pages.

U.S. Appl. No. 15/051,807, filed Feb. 24, 2016, entitled "Styrene-Butadiene Block Copolymers with an Internal Butadiene Block for Tubing Applications."

U.S. Appl. No. 15/226,945, filed Aug. 3, 2016, entitled "Styrene-Butadiene Block Copolymers with an Internal Butadiene Block for Tubing Applications."

\* cited by examiner

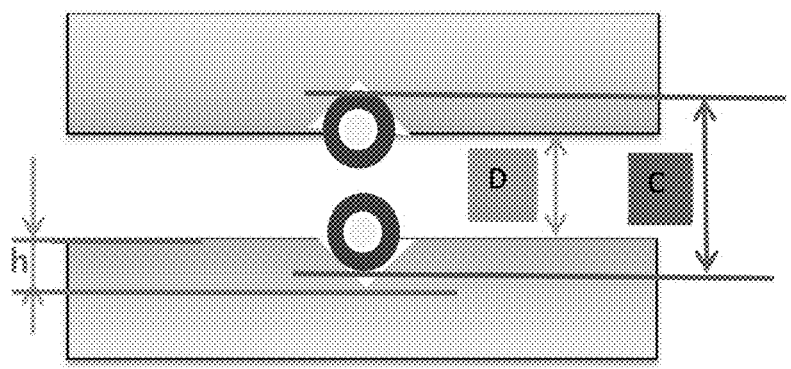

BLENDS OF STYRENE-BUTADIENE BLOCK COPOLYMER WITH STYRENIC THERMOPLASTIC ELASTOMERS FOR TUBING APPLICATIONS

BACKGROUND OF THE INVENTION

Flexible PVC has been the material of choice for many applications due to its low cost and unique combination of properties. In applications such as flexible tubing for medical applications, flexible PVC has suitable strength, flexibility, and kink resistance, and yet is not too tacky or sticky. However, flexible PVC requires significant amounts of plasticizers, which depending upon the specific composition, are being replaced or phased out due to health concerns and PVC incineration by-product concerns.

It would be beneficial to have a non-PVC composition that has acceptable strength, flexibility, and kink resistance for use in medical tubing and other traditional PVC applications. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Polymer compositions are disclosed and described herein, and such polymer compositions can comprise a conjugated diene monovinylarene block copolymer and a styrenic thermoplastic elastomer. The weight ratio of the conjugated diene monovinylarene block copolymer to the styrenic thermoplastic elastomer is not limited to any particular range, however in certain embodiments consistent with this invention, the weight ratio can be in a range from about 5:95 to about 25:75, or from about 10:90 to about 20:80.

The polymer compositions can be further characterized by an unexpectedly low kink resistance value. The kink resistance of tubing produced from the polymer composition often can be less than or equal to about 32 mm, when tested in accordance with DIN EN 13868.

Articles can be produced from and/or can contain the polymer compositions disclosed herein. Representative articles can include sheet products, film products, tubing products, and adhesive products.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURE

The FIGURE presents a schematic of the apparatus used to determine the kink resistance and re-kink resistance of tubing, as described herein.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise. For example, a composition provided in an embodiment of the invention can comprise, or alternatively, consist essentially of, or alternatively, consist of, (a) a conjugated diene monovinylarene block copolymer, and (b) a styrenic thermoplastic elastomer.

The terms "a," "an," and "the" are intended to include plural alternatives, e.g., at least one. For instance, the disclosure of "a conjugated diene monovinylarene block copolymer" or "a styrenic thermoplastic elastomer" is meant to encompass one, or mixtures or combinations of more than one, conjugated diene monovinylarene block copolymer or styrenic thermoplastic elastomer, unless otherwise specified.

The term "polymer" is used herein generically to include homopolymers, copolymers, terpolymers, and so forth, while a "copolymer" is used generically to include copolymers, terpolymers, and so forth. Thus, "polymer" and "copolymer" encompass polymeric materials derived from any monomer and comonomer (one or more than one) disclosed herein. As would be readily recognized by those of skill in the art, block copolymers in accordance with this invention contain a mixture of polymer chains of various sizes (e.g., a distribution of molecular weights), and the respective polymer chains can vary compositionally (e.g., relative amounts of conjugated diene monomer versus monovinylarene monomer).

As used herein, a "conjugated diene monomer" refers to an organic compound containing conjugated carbon-carbon double bonds and often a total of 4 to 12 carbon atoms, such as 4 to 8 carbon atoms. Exemplary conjugated diene monomers can include, but are not limited to, 1,3-butadiene, 2-methyl-1,3-butadiene (isoprene), 2-ethyl-1,3-butadiene, 2,3-dimethyl-1,3-butadiene, 1,3-pentadiene, 3-butyl-1,3-octadiene, and the like, as well as mixtures thereof. For example, in some embodiments disclosed herein, the conjugated diene monomer can be a butadiene, while in other embodiments, the conjugated diene monomer can be 1,3-butadiene.

A unit of a polymer, wherein the unit is derived from polymerization of a conjugated diene monomer, can be referred to as a "conjugated diene unit."

As used herein, a "monovinylarene monomer" refers to an organic compound containing a single carbon-carbon double bond, at least one aromatic moiety, and often a total of 8 to 18 carbon atoms, such as 8 to 12 carbon atoms. Exemplary monovinylarene monomers can include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, diphenylethylene, and the like, as well as mixtures thereof. For example, in some embodiments disclosed herein, the monovinylarene monomer can be styrene.

A unit of a polymer, wherein the unit is derived from polymerization of a monovinylarene monomer, can be referred to as a "monovinylarene unit."

A "conjugated diene monovinylarene block copolymer" is a polymer comprising polymer chains containing monovinylarene monomer units and conjugated diene monomer units. For example, in some embodiments disclosed herein, the conjugated diene monovinylarene block copolymer can be a styrene butadiene copolymer. The conjugated diene monovinylarene block copolymer comprises more than one block, wherein each block comprises monovinylarene monomer units and/or conjugated diene monomer units. If the block comprises only one type of monomer unit, it can be termed a "monoblock." If the block comprises both, it can be termed a "mixed" block. Exemplary mixed blocks can include, but are not limited to, random blocks, tapered blocks, stepwise blocks, or any other type of mixed block.

A mixed block is "tapered" when both (a) the mole fraction of conjugated diene units in a first section of the block is higher than the mole fraction of conjugated diene units in a second section of the block, wherein the second section of the block is closer to a given end of the block, and (b) condition (a) is true for substantially all sections of the block. Depending on the size of the sections being considered, condition (a) may not be true for all sections, but if so, will be not true at no more than about the level expected by chance.

A mixed block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

The terms "contact product," "contacting," and the like, are used herein to describe compositions wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, compounded products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein, in their entirety, by reference for the purpose of describing and disclosing, for example, the constructs and methodologies that are described in the publications, which might be used in connection with the presently described invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. A representative example follows for the kink resistance of tubing produced from polymer compositions in embodiments of this invention. For example, by a disclosure that the kink resistance is in a range from about 10 mm to about 28 mm, Applicants intend to recite that the kink resistance can be any kink resistance in the range and can be equal to, for instance, about 10, about 11, about 12, about 13, about 14, about 15, about 16, about 17, about 18, about 19, about 20, about 21, about 22, about 23, about 24, about 25, about 26, about 27, or about 28 mm. Additionally, the kink resistance can be within any range from about 10 to about 28 mm (for example, the kink resistance can be in a range from about 10 to about 25 mm), and this also includes any combination of ranges between about 10 and about 28 mm. Likewise, all other ranges disclosed herein should be interpreted in a manner similar to this representative example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present disclosure is directed generally to polymer compositions containing conjugated diene monovinylarene block copolymers and styrenic thermoplastic elastomers, and articles produced using these polymer compositions. Unexpectedly, the kink resistance and other characteristics of these polymer compositions make them suitable replacements for flexible PVC in many end-use applications.

Polymer Compositions

Polymer compositions of the present invention can comprise (or consist essentially of, or consist of) a conjugated diene monovinylarene block copolymer and a styrenic thermoplastic elastomer. Generally, the features of any of these compositions (e.g., the features and attributes of the conjugated diene monovinylarene block copolymer, the features and attributes of the styrenic thermoplastic elastomer, the relative amounts of the respective components, the presence or absence of additional components, among others) are independently described herein, and these features can be combined in any combination to further describe the disclosed polymer compositions.

While not being limited thereto, the weight ratio of the conjugated diene monovinylarene block copolymer to the styrenic thermoplastic elastomer often can fall within a range from about 2:98 to about 95:5. In one embodiment, for instance, the weight ratio of the conjugated diene monovinylarene block copolymer to the styrenic thermoplastic elastomer can be in a range from about 5:95 to about 95:5, or from about 2:98 to about 50:50. In another embodiment, the weight ratio can be in a range from about 5:95 to about 35:65, or from about 5:95 to about 30:70. In yet another embodiment, the weight ratio can be in a range from about 2:98 to about 25:75, or from about 5:95 to about 25:75. In still another embodiment, the weight ratio of the conjugated diene monovinylarene block copolymer to the styrenic thermoplastic elastomer can be in range from about 7:93 to about 22:78, or from about 10:90 to about 20:80. Other appropriate ranges for the weight ratio of the conjugated diene monovinylarene block copolymer to the styrenic thermoplastic elastomer are readily apparent from this disclosure. If more than one conjugated diene monovinylarene block copolymer and/or more than one styrenic thermoplastic elastomer is/are present in the polymer composition, this ratio is based on the total weights of the respective components.

Consistent with particular embodiments of this invention, the conjugated diene monovinylarene block copolymer and the styrenic thermoplastic elastomer can represent a majority of the polymer composition, i.e., at least 50 wt. %. Accordingly, the polymer composition can contain at least about 60 wt. %, at least about 75 wt. %, at least about 85 wt. %, or at least about 95 wt. %, of the combination of the conjugated diene monovinylarene block copolymer and the styrenic thermoplastic elastomer (total). Illustrative and non-limiting ranges for the total amount of the conjugated diene monovinylarene block copolymer and the styrenic thermoplastic elastomer present in the polymer composition can include the following: from about 50 wt. % to 100 wt. %, from about 60 wt. % to 100 wt. %, from about 80 wt. % to 100 wt. %, from about 90 wt. % to 100 wt. %, from about 60 wt. % to about 95 wt. %, or from about 70 wt. % to 98 wt. %. Other appropriate ranges for the total amount of the conjugated diene monovinylarene block copolymer and the styrenic thermoplastic elastomer present in the polymer composition are readily apparent from this disclosure.

While not a requirement, the polymer compositions described herein typically do not contain a plasticizer. Indeed, this can be an advantage over other polymer compositions, such as those containing PVC, which may require relatively large amounts of plasticizers to impart flexibility. However, if desired for a particular end-use, a plasticizer can be combined with the polymer compositions at an appropriate loading.

The polymer compositions can be modified with any suitable additive or additives, as recognized by those of skill in the art. For instance, the polymer composition can contain one or more additives selected from an antioxidant, an acid scavenger, an antiblock additive, a slip additive (e.g., a fatty acid amide, erucamide), a colorant, a filler, a polymer processing aid (e.g., a fluoroelastomer), a UV absorber, a UV inhibitor, a lubricant (e.g., a wax, a mineral oil), and the like, as well as any combination thereof. In some embodiments, the polymer composition (comprising a conjugated diene monovinylarene block copolymer and a styrenic thermoplastic elastomer) can further comprise an antioxidant; alternatively, an acid scavenger; alternatively, an antiblock additive; alternatively, a slip additive; alternatively, a colorant; alternatively, a filler; alternatively, a polymer processing aid; alternatively, a UV absorber; alternatively, a UV inhibitor; or alternatively, a lubricant. These and other suitable additives and modifiers, which may be added to the polymer composition (or to the conjugated diene monovinylarene block copolymer, or to the styrenic thermoplastic elastomer) in order to provide beneficial polymer processing or end-use product attributes, are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. As a non-limiting example, mineral oil can be added to the composition and can result in a higher melt flow rate and a lower Shore A hardness of the composition.

In some embodiments, the polymer composition can be substantially free of any polymer different from the conjugated diene monovinylarene block copolymer and the styrenic thermoplastic elastomer, i.e., the polymer composition contains less than about 5 wt. % of the different polymer (based on the polymer composition). In further embodiments, the polymer composition can contain the conjugated diene monovinylarene block copolymer, the styrenic thermoplastic elastomer, and less than about 4 wt. %, less than about 2 wt. %, or less than about 1 wt. %, of a polymer different from the conjugated diene monovinylarene block copolymer and the styrenic thermoplastic elastomer. In another embodiment, the polymer composition contains no polymer (0 wt. %) that is different from the conjugated diene monovinylarene block copolymer and the styrenic thermoplastic elastomer.

Alternatively, the polymer composition can contain another polymer (a third polymer) that is different from the conjugated diene monovinylarene block copolymer and the styrenic thermoplastic elastomer, at any suitable amount. The third polymer in the polymer composition is not particularly limited, and illustrative examples include a polystyrene, a high impact polystyrene, a polybutadiene, a polyolefin (LDPE, LLDPE, PP, etc.), a hydrogenated SBS, a styrene-ethylene-butylene-styrene block copolymer, a styrene-isoprene-styrene block copolymer, and the like, as well as combinations thereof.

The polymer compositions containing the conjugated diene monovinylarene block copolymer and the styrenic thermoplastic elastomer can be produced by any suitable method, such as by mixing or blending or compounding the conjugated diene monovinylarene block copolymer with the styrenic thermoplastic elastomer. The polymer compositions described herein can have a variety of properties which make them suitable for various end-use applications. These polymer compositions can be further characterized by any of the polymer properties listed below, and in any combination.

Unexpectedly, the polymer composition can have a kink resistance of tubing produced from the composition of less than or equal to about 32 mm, when tested in accordance with DIN EN 13868 as described herein. In one embodiment, the kink resistance can be less than or equal to about 30 mm, less than or equal to about 28 mm, or less than or equal to about 26 mm. Representative non-limiting ranges for the kink resistance include the following: from about 8 mm to about 32 mm, from about 8 to about 30 mm, from about 8 mm to about 28 mm, from about 10 to about 32 mm, from about 10 to about 30 mm, from about 10 to about 28 mm, from about 9 to about 30 mm, from about 15 mm to about 32 mm, from about 15 to about 30 mm, or from about 15 to about 28 mm, and the like. Other appropriate ranges for the kink resistance of the polymer composition are readily apparent from this disclosure.

Likewise and unexpectedly, the polymer composition also can have a re-kink resistance of tubing produced from the composition of less than or equal to about 32 mm, less than or equal to about 30 mm, less than or equal to about 28 mm, or less than or equal to about 26 mm. Similarly, representative non-limiting ranges for the re-kink resistance include the following: from about 8 mm to about 32 mm, from about 8 to about 30 mm, from about 8 mm to about 28 mm, from about 10 to about 32 mm, from about 10 to about 30 mm, from about 10 to about 28 mm, from about 9 to about 30 mm, from about 15 mm to about 32 mm, from about 15 to about 30 mm, or from about 15 to about 28 mm, and the like. Other appropriate ranges for the re-kink resistance of the polymer composition are readily apparent from this disclosure. The re-kink resistance is also tested in accordance with DIN EN 13868 as described herein.

The Shore A hardness of the polymer composition typically can fall within a range from about 20 to about 95, from about 35 to about 90, or from about 40 to about 90. In some embodiments, the Shore A hardness can be in a range from about 45 to about 80, from about 50 to about 75, or from about 55 to about 70, and the like. Other appropriate ranges for the Shore A hardness of the polymer composition are readily apparent from this disclosure.

Polymer compositions in various embodiments of this invention generally can have a melt flow rate (MFR) of less than or equal to about 40 g/10 min. MFR is determined in accordance with ASTM D1238 at 200° C. with a 5 Kg load. Melt flow rates in the range from about 1 to about 30, from about 2 to about 30, from about 3 to about 20, or from about 4 to about 20 g/10 min, are contemplated in other embodiments of this invention. For example, the polymer composition can have a MFR in a range from about 3 to about 15, from about 4 to about 18, or from about 5 to about 10 g/10 min. Other appropriate ranges for the MFR of the polymer composition are readily apparent from this disclosure.

Single layer structures, multilayer structures (e.g., coextrusions), and/or laminated structures (e.g., adhesive laminations) can contain the polymer compositions described herein. The polymer compositions, single, multilayer and laminated structures, and so forth, can be formed into various articles of manufacture, and these articles of manufacture can have any thickness suitable for the desired end-use application. Articles which can comprise compositions, multilayer structures, etc., of this invention can include, but are not limited to, a film, a sheet, a bottle or container, a fiber or fabric, an adhesive or coating, a medical device or material, a pipe, or a flexible tube, and the like. Various processes can be employed to form these articles. Non-limiting examples of these processes include injection molding, blow molding, rotational molding, film extrusion, sheet extrusion, profile extrusion, thermoforming, and the like. Such processes and materials are described in *Modern Plastics Encyclopedia*, Mid-November 1995 Issue, Vol. 72, No. 12; and *Film Extrusion Manual—Process, Materials, Properties*, TAPPI Press, 1992.

In some embodiments of this invention, an article of manufacture can comprise any of the polymer compositions described herein (e.g., including single layer structures, multilayer structures, etc.), can have any of the polymer compositional properties described herein, and the article of manufacture can be a tubing product, such as flexible tubing for medical applications. Moreover, this tubing product can have a kink resistance of less than or equal to about 32 mm, less than or equal to about 30 mm, less than or equal to about 28 mm, from about 8 mm to about 32 mm, from about 8 to about 30 mm, from about 8 mm to about 28 mm, from about 10 to about 32 mm, from about 10 to about 30 mm, from about 10 to about 28 mm, from about 9 to about 30 mm, from about 15 mm to about 32 mm, from about 15 to about 30 mm, or from about 15 to about 28 mm, and the like.

Conjugated Diene Monovinylarene Block Copolymers

Any suitable conjugated diene monovinylarene block copolymers can be used in the polymer compositions described herein, and various monovinylarene monomers and conjugated diene monomers can be used to form the conjugated diene monovinylarene block copolymers. As described herein, the monovinylarene monomer often can contain from 8 to 18 carbon atoms (e.g., the monovinylarene monomer can be styrene or, alternatively, the monovinylarene monomer can be methylstyrene), and the conjugated diene monomer can contain from 4 to 12 carbon atoms (e.g., the conjugated diene can be a butadiene or, alternatively, the conjugated diene can be 1,3-butadiene). Accordingly, in a particular embodiment disclosed herein, the conjugated diene monovinylarene block copolymer can comprise a styrene butadiene block copolymer (SBC).

The relative amount of conjugated diene and monovinylarene in the block copolymer is not limited to any particular range, however, the conjugated diene monovinylarene block copolymer typically can have from about 15 to about 95 wt. %, or from about 25 to about 95 wt. %, monovinylarene monomer content, based on the total weight of the (final) block copolymer. In some embodiments, the conjugated diene can be the major component, and the conjugated diene monovinylarene block copolymer can have from about 20 to about 50 wt. % monovinylarene monomer content, from about 25 to about 50 wt. % monovinylarene monomer content, from about 20 to about 45 wt. % monovinylarene monomer content, or from about 25 to about 45 wt. % monovinylarene monomer content, based on the total weight of the block copolymer. In other embodiments, the monovinylarene can be the major component (i.e., a high styrene content conjugated diene monovinylarene block copolymer), and the conjugated diene monovinylarene block copolymer can have from about 50 to about 95 wt. % monovinylarene monomer content, from about 55 to about 90 wt. % monovinylarene monomer content, from about 55 to about 80 wt. % monovinylarene monomer content, or from about 65 to about 80 wt. % monovinylarene monomer content, based on the total weight of the block copolymer. For example, the conjugated diene monovinylarene block copolymer can have from about 55 to about 85 wt. % monovinylarene monomer content, from about 60 to about 85 wt. % monovinylarene monomer content, from about 60 to about 80 wt. % monovinylarene monomer content, or from about 62 to about 78 wt. % monovinylarene monomer content, based on the total weight of the block copolymer.

In an embodiment of this invention, the conjugated diene monovinylarene block copolymer can be an uncoupled conjugated diene monovinylarene block copolymer. Uncoupled block copolymers often can be referred to in the art as terminated or quenched copolymers. In further embodiments, the conjugated diene monovinylarene block copolymer can be an uncoupled unimodal conjugated diene monovinylarene block copolymer, or alternatively, the block copolymer can be an uncoupled multimodal conjugated diene monovinylarene block copolymer.

In yet another embodiment of this invention, the conjugated diene monovinylarene block copolymer can be a coupled conjugated diene monovinylarene block copolymer. Further, the coupled conjugated diene monovinylarene block copolymer can be a coupled unimodal conjugated diene monovinylarene block copolymer or a coupled multimodal conjugated diene monovinylarene block copolymer. In some embodiments, the block copolymer can be produced by coupling at least two different living polymer chains having been produced by at least two separate charges of initiator. Coupling can be accomplished by any method known to those of skill in the art, such as described herein.

In an embodiment, the conjugated diene monovinylarene block copolymer can comprise at least 2 blocks, at least 3 blocks, at least 4 blocks, or at least 5 blocks. For example, the conjugated diene monovinylarene block copolymer can comprise from 2 to 10 blocks, from 3 to 10 blocks, from 3 to 7 blocks, from 4 to 7 blocks, from 4 to 6 blocks, or from 3 to 5 blocks, and so forth. Any blocks can be selected independently from any combination of conjugated diene monoblocks, monovinylarene monoblocks, or conjugated diene monovinylarene mixed blocks. Any mixed block, for instance, independently can be a tapered mixed block or a random mixed block. In accordance with this disclosure, repeated blocks with an intervening charge of initiator are not considered to be one block.

In certain embodiments, each mixed conjugated diene monovinylarene block, independently, can contain conjugated diene units and monovinylarene units with a weight ratio of conjugated diene units to monovinylarene units in a range from about 0.05 to about 0.33, from about 0.06 to about 0.28, or from about 0.08 to about 0.26, although not being limited thereto.

Optionally, the conjugated diene monovinylarene block copolymer can be hydrogenated, although this is not a requirement. In one embodiment, for instance, the block copolymer can be partially hydrogenated, while in another embodiment, the block copolymer can be fully hydrogenated.

The block copolymers can be produced using any suitable polymerization process using various types of polymerization reactors, polymerization reactor systems, and polymerization reaction conditions, as recognized by those of skill in the art. While not being limited thereto, general information on processes for producing conjugated diene monovinylarene block copolymers that can be employed in various embodiments of this invention are described in U.S. Pat. Nos. 3,639,517, 6,096,828, 6,420,486, 6,444,755, 6,835,778, 7,037,980, 7,193,014, 7,875,678, 8,415,429, and 8,933,171, the disclosures of which are incorporated herein by reference in their entirety; and U.S. Patent Publication Nos. 2006/0089457 and 2007/0173605, the disclosures of which are incorporated herein by reference in their entirety.

In some embodiments of this invention, conjugated diene monovinylarene block copolymers comprising from about 35 phm to about 80 phm monovinylarene monomer can be produced, and these block copolymers can comprise polymer chains containing a block structure having formula (1):

$$S_1\text{-}(S/B)_1 \quad (1).$$

In formula (1), $S_1$ can be a monoblock of the monovinylarene monomer, wherein $S_1$ can be from about 10 phm to about 45 phm of the copolymer, and $(S/B)_1$ can be a mixed block of the conjugated diene monomer and the monovinylarene monomer, wherein the monovinylarene monomer content can be from about 20 wt. % to about 80 wt. %, based on the total weight of $(S/B)_1$. The abbreviation "phm" means parts by weight per hundred parts of total monomer in the copolymer.

Consistent with certain embodiments of this invention, the monovinylarene monomer content of the conjugated diene monovinylarene block copolymer having formula (1) often can be in a range from about 35 phm to about 80 phm, from about 40 phm to about 80 phm, or from about 40 phm to about 75 phm. In further embodiments, the monovinylarene monomer content, based on the conjugated diene monovinylarene block copolymer, can be in a range from about 55 phm to about 80 phm, from about 60 phm to about 80 phm, or from about 55 phm to about 78 phm.

In an embodiment, $S_1$ (the monoblock of the monovinylarene monomer) can be in a range from about 10 phm to about 45 phm, from about 18 phm to about 42 phm, or from about 20 phm to about 40 phm. In another embodiment, $S_1$, based on the conjugated diene monovinylarene block copolymer, can be in a range from about 20 phm to about 35 phm, from about 25 phm to about 40 phm, or from about 25 phm to about 35 phm.

In an embodiment, the monovinylarene monomer content based on the weight of the mixed block of $(S/B)_1$ often can be in a range from about 20 wt. % to about 80 wt. %, from about 25 wt. % to about 75 wt. %, or from about 20 wt. % to about 70 wt. %. In another embodiment, the monovinylarene monomer, based on the weight of $(S/B)_1$, can be in a range from about 20 wt. % to about 65 wt. %, from about 40 wt. % to about 65 wt. %, from about 20 wt. % to about 55 wt. %, or from about 40 wt. % to about 60 wt. %.

An illustrative and non-limiting example of a conjugated diene monovinylarene block copolymer of the present invention can have formula (1) and the following characteristics: a monovinylarene monomer content in a range from about 55 phm to about 80 phm (or from about 60 phm to about 80 phm), $S_1$ in a range from about 20 phm to about 38 phm (or from about 25 phm to about 36 phm), and a monovinylarene monomer content of $(S/B)_1$ in a range from about 25 wt. % to about 75 wt. % (or from about 35 wt. % to about 65 wt. %).

As noted herein, $S_1$ in formula (1) can be a monoblock of the monovinylarene monomer, wherein $S_1$ can be from about 10 phm to about 45 phm of the copolymer. In these and other embodiments, $S_1$ can be a single monoblock of the monovinylarene monomer, or $S_1$ can be two or more monoblocks of the monovinylarene monomer, and optionally, initiator can be added before each monovinylarene monomer charge. Accordingly, $S_1$ can be produced by a process comprising any suitable number of monovinylarene monomer charges to result in 10 phm to 45 phm, for example, from 1 to 10 charges, from 1 to 6 charges, from 1 to 3 charges, 1 charge, from 2 to 8 charges, from 2 to 5 charges, from 2 to 3 charges, or 2 charges, and the like. Thus, $S_1$ can be two monovinylarene blocks, such as in block structure $S_a\text{-}S_b$, or $S_1$ can be three monovinylarene monomer blocks, such as in block structure $S_a\text{-}S_b\text{-}S_c$, and so forth. Optionally, in the process of producing such block structures, initiator can be added before each monovinylarene monomer charge.

Likewise, $(S/B)_1$ in formula (1) can be a single mixed block of the conjugated diene monomer and the monovinylarene monomer, or $(S/B)_1$ can be two or more mixed blocks of the conjugated diene monomer and the monovinylarene monomer. Thus, $(S/B)_1$ can be two mixed blocks, such as in block structure $(S/B)_a\text{-}(S/B)_b$, or $(S/B)_1$ can be three mixed blocks, such as in block structure $(S/B)_a\text{-}(S/B)_b\text{-}(S/B)_c$, and so forth. While not a requirement, often the monovinylarene monomer content, independently, in each mixed block (such as $(S/B)_a$, $(S/B)_b$, and $(S/B)_c$) can range from 20 wt. % to 80 wt. %, from about 25 wt. % to about 75 wt. %, or from about 40 wt. % to about 65 wt. %, based on the total weight of each mixed block. In some embodiments, at least one of these mixed blocks can be a tapered mixed block, while in other embodiments, at least one of these mixed blocks can be a random mixed block. Such mixed blocks can be produced by any suitable technique (e.g., pulsed monomer charges).

In accordance with this invention, any suitable sequence used to produce a conjugated diene monovinylarene block copolymer can be employed. For instance, and not to be limited thereto, encompassed herein are the following charge sequences, each have at least one "(S/B)" dual charge:

(A) i-S-S-i-(S/B)-X;
(B) i-S-i-(S/B)-i-S-B-X;
(C) i-S-i-S-(S/B)-i-S-B-X;
(D) i-S-i-S-(S/B)-(S/B)-X;
(E) i-S-i-S-(S/B)-(S/B)-B-X;
(F) i-S-i-S-(S/B)-(S/B)-(S/B)-X;
(G) i-S-i-S-(S/B)-(S/B)-(S/B)-B-X;
(H) i-S-i-S-(S/B)-(S/B)-(S/B)-(S/B)-X; and
(I) i-S-i-S-(S/B)-(S/B)-(S/B)-(S/B)-B-X.

In formulas (A) to (I), S is a monovinylarene charge (to produce a monoblock of the monovinylarene, such as styrene), B is a conjugated diene charge (to produce a monoblock of the conjugated diene, such as butadiene), and (S/B) is a dual charge of the monovinylarene and conjugated diene (to produce a mixed block of the conjugated diene and monovinylarene). Each i is an initiator, the presence of which can start a new polymer chain. X in these formulas represents a coupling agent or a terminating agent.

An illustrative process for producing a block copolymer using charge sequence (F), therefore, can comprise contacting:

(i) a first initiator charge and a first charge of the monovinylarene monomer and allowing polymerization to occur until minimal free monomer is present; thereafter contacting all products of step (i) with (ii) a second initiator charge and a second charge of the monovinylarene monomer and allowing polymerization to occur until minimal free monomer is present; thereafter contacting all products of step (ii) with (iii) a first mixture of the monovinylarene monomer and the conjugated diene monomer and allowing polymerization to occur until minimal free monomer is present; thereafter contacting all products of step (iii) with (iv) a second mixture of the monovinylarene monomer and the conjugated diene monomer and allowing polymerization to occur until minimal free monomer is present; thereafter contacting all products of step (iv) with (v) a third mixture of the monovinylarene monomer and the conjugated diene monomer and allowing polymerization to occur until minimal free monomer is present; thereafter contacting all products of step (v) with (vi) a coupling agent.

In this process, and optionally, at least one step in the process can comprise polymerization in the presence of a modifier. In these and other embodiments, the modifier can comprise any suitable modifier, typically a polar organic compound, non-limiting examples of which can include a potassium alkoxide, a sodium alkoxide, a metal alkoxide or phenolate, a tertiary amine, an ether (e.g., THF, diglyme, etc.), a thioether, and the like, as well as a mixture or combination thereof. In a particular embodiment, the modifier can comprise dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetrahydrofuran (THF), potassium tert-amylate (KTA), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and the like, as well as mixtures or combinations thereof. When present, the modifier (e.g., THF) often can be utilized at a molar ratio of the modifier to total monomer of less than about 1:30, less than about 1:50, less than about 1:100, or less than about 1:500. Representative non-limiting ranges for the modifier:monomer molar ratio include the following: from about 1:100,000 to about 1:50, from about 1:10,000 to about 1:100, from about 1:10,000 to about 1:500, or from about 1:5,000 to about 1:500, and the like.

As described herein, the processes for producing block copolymers are conducted in the presence of an initiator. Suitable initiators are well known to those of skill in the art, such as alkali metal hydrocarbons, a representative example of which is n-butyl lithium. Each initiator can be either the same or different; for instance, the second initiator charge can be the same as or different from the first charge. The amount of initiator employed can depend on many factors, but typically can be in the range from about 0.01 phm to about 1 phm, from about 0.01 phm to about 0.5 phm, or from about 0.01 phm to about 0.2 phm (phm is parts by weight per hundred parts of total monomer in the copolymer). In a further embodiment, an additional initiator charge can be used in at least one of steps (iii) to (v), such as, an additional initiator charge in step (iii); additionally or alternatively, an additional initiator charge in step (iv); additionally or alternatively, an additional initiator charge in step (v).

As would be readily recognized by those of skill in the art, the steps in these processes can produce block copolymers with polymer chains containing a block structure having formula (1).

The polymerization process can be conducted in any suitable hydrocarbon diluent at any suitable polymerization temperature, such as in the range of from about −100° C. to about 150° C., of from about 10° C. to about 125° C., at a pressure sufficient to maintain the reaction mixture substantially in the liquid phase. Illustrative hydrocarbon diluents can include, but are not limited to, pentane, hexane, octane, cyclopentane, cyclohexane, and the like, as well as mixtures or combinations thereof. Often, the polymerization process can be conducted in the substantial absence of oxygen and water, and more often, under an inert gas atmosphere. Moreover, as noted herein, each charge of monomer or mixture of monomers can be polymerized to substantial completion, before a subsequent charge of monomer or mixture of monomers (with or without initiator) is commenced.

In step (vi), after polymerization is complete, a coupling agent can be added. Suitable coupling agents can include di- or multivinylarene compounds, di- or multiepoxides, di- or multiisocyanates, di- or multiimines, di- or multialdehydes, di- or multiketones, alkoxytin compounds, di- or multihalides (e.g., silicon halides and halosilanes), mono-, di-, or multianhydrides, di- or multiesters (e.g., esters of monoalcohols with polycarboxylic acids, esters of monohydric alcohols with dicarboxylic acids, esters of monobasic acids with polyalcohols such as glycerol), and the like, and as well as any mixture or combination thereof. Other suitable multifunctional coupling agents can include epoxidized natural source oils, such as epoxidized soybean oil, epoxidized linseed oil, and the like, as well as combinations thereof. The amount of the coupling agent employed can depend on many factors, but typically can be in the range from about 0.1 phm to about 20 phm, from about 0.1 phm to about 5 phm, or from about 0.1 phm to about 2 phm.

Whether coupling or not, termination of the polymerization reaction can be accomplished using any suitable deactivating agent, illustrative examples of which can include water, carbon dioxide, an alcohol, a phenol, a mono- or di-carboxylic acid, and the like, and combinations thereof.

The conjugated diene monovinylarene block copolymers described herein for use in the polymer compositions of this invention can encompass a broad range of melt flow rates and molecular weights. For instance, block copolymers in various embodiments of this invention generally can have a melt flow rate (MFR) of less than or equal to about 40 g/10 min. MFR is determined in accordance with ASTM D1238 at 200° C. with a 5 Kg load. Melt flow rates in the range from about 1 to about 30, from about 2 to about 25, from about 3 to about 20, from about 4 to about 20, or from about 5 to about 15 g/10 min, are contemplated in other embodiments of this invention. For example, the block copolymer can have a MFR in a range from about 3 to about 15, from about 4 to about 18, or from about 5 to about 10 g/10 min.

In some embodiments, the number-average molecular weight (Mn) of the block copolymers disclosed herein can be in a range from about 5,000 to about 2,000,000 g/mol, from about 50,000 to about 2,000,000 g/mol, or from about 50,000 to about 1,000,000 g/mol. In other embodiments, the Mn can be in range from about 10,000 to about 700,000 g/mol, from about 20,000 to about 700,000 g/mol, from about 35,000 to about 700,000 g/mol, from about 50,000 to about 700,000 g/mol, from about 25,000 to about 500,000 g/mol, or from about 10,000 to about 500,000 g/mol.

Styrenic Thermoplastic Elastomers

Any suitable styrenic thermoplastic elastomer can be used in the polymer compositions described herein. In one embodiment, for instance, the styrenic thermoplastic elastomer can be a low styrene content thermoplastic elastomer, typically with from about 10 to about 45 wt. %, or from about 10 to about 40 wt. %, styrene content, based on the total weight of the styrenic thermoplastic elastomer. In another embodiment, the styrenic thermoplastic elastomer can have from about 15 to about 40 wt. %, or from about 15 to about 35 wt. %, styrene content, based on the total weight of the styrenic thermoplastic elastomer. In yet another embodiment, the styrenic thermoplastic elastomer can have from about 20 to about 35 wt. %, or from about 22 to about 32 wt. %, styrene content, based on the total weight of the styrenic thermoplastic elastomer.

Consistent with particular embodiments of this invention, the styrenic thermoplastic elastomer can comprise a styrene-butadiene-styrene block copolymer, often referred to as a SBS copolymer.

Optionally, the styrenic thermoplastic elastomer can be hydrogenated, although this is not a requirement. In one embodiment, for instance, the styrenic thermoplastic elastomer can be partially hydrogenated, while in another embodiment, the styrenic thermoplastic elastomer can be fully hydrogenated.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Kink resistance testing was performed with an apparatus designed and built in accordance with DIN EN 13868: 2002-11 (Annex A, short term test method), and as described herein. The water line consisted of ⅜-inch (9.525-mm) OD (outside diameter) tubing with flow meters to measure water flow. The groove used to hold the tubing test specimen in place had a depth of 5.05 mm as measured. Tubing test specimens were 16 inches (406.4 mm) in length, and the test speed was kept low enough to avoid over pressurizing the tubing.

The tubing test specimens had an OD of ¼ inch (6.35 mm), represented by d in the equation below, and a nominal ID (inside diameter) of ⅛ inch (3.175 mm). In reference to the testing diagram in The FIGURE, the plate distance was measured as D in mm, and the reported kink resistance (C in the equation below, mm) was calculated according to the following equation:

$$C = D + 2h - d(\sqrt{2}-1) = D + 7.5 \text{ (mm)},$$

where D is the measured plate distance at half of the original water flow rate (decrease in flow rate such the initial flow rate through the straight tubing is reduced by 50%), h is the measured groove depth (5.05 mm), and d is the tubing OD (6.35 mm). A manual press capable of providing a force up to 50 $lb_f$ was used to close the gap between plates during testing.

The water temperature was set to ambient conditions of about 25° C. The rate at which force was applied by the press was manually adjusted to prevent sudden kinking of the tubing during the test (i.e., to prevent the water flow rate from decreasing to zero before the kink resistance could be measured).

Re-kink resistance was measured under the same conditions as those described for kink resistance testing. After the initial kink test was performed, the re-kink resistance was measured by opening the plate distance and repeating the procedure to measure the point at which the water flow rate decreased to half of the flow rate observed at the start of the re-kink test. Typically, the re-kink measurement (C in the equation provided above) was higher than the kink measurement due to the weak spot that formed in the tubing during the original kink measurement.

Tubing specimens for kink resistance testing and re-kink resistance testing were produced using single screw extrusion. The extruder was a Vented Extruder Model 2523, ¾", L/D 25:1 Ratio, from C.W. Brabender® Instruments Inc. The tubing die was an interchangeable die head with 0.25 inch (6.35 mm) OD and 0.125 inch (3.175 mm) ID mandrel tip combinations. The typical temperature profile ranges used for tubing extrusion are provided in Table I below.

TABLE I

Extrusion Conditions.

| | Range | Range |
|---|---|---|
| Rear (feed) | 280°-365° F. | (138°-185° C.) |
| Middle (transition) | 320°-390° F. | (160°-199° C.) |
| Front (near die end) | 320°-390° F. | (160°-199° C.) |
| Die | 280°-365° F. | (138°-185° C.) |
| Extruder speed | 40-100 RPM | |
| Puller Speed | 15-40 RPM | |

Shore A hardness testing was performed according to ASTM D2240-05 with a 30 second delay. The Shore A hardness test was performed at ambient conditions on a compression molded 2 inch×2 inch (50.8 mm×50.8 mm) square specimen with ½ inch (12.7 mm) thickness.

Melt Flow Rate (MFR) was measured according to modified ASTM D1238-13 using the standard polystyrene conditions (load of 5 kg and temperature of 200° C.) with a holding time of 300 seconds.

Examples 1-8

The following polymer resins were converted into tubing, and the resulting tubing was used for comparative testing.
1. K-Resin® SBC XK40—commercially available from Chevron Phillips Chemical Company LP—nominal 76 wt. % styrene.
2. Experimental styrene butadiene copolymer with two initiator charges and no mixed blocks—nominal 33 wt. % styrene.
3. Experimental styrene butadiene copolymer with two initiator charges and no mixed blocks—nominal 31 wt. % styrene.
4. Vector® 8508 SBS block copolymer—commercially available from Dexco Polymers LP—nominal 29 wt. % styrene.
5. K-Resin® SBC KR20—commercially available from Chevron Phillips Chemical Company LP—nominal 62 wt. % styrene.
6. LCY 3527 SBS block copolymer—commercially available from LCY Chemical Corporation—nominal 25 wt. % styrene.
7. Versaflex™ HC MT224 thermoplastic elastomer—commercially available from GLS Thermoplastic Elastomers PolyOne Corporation—blend of SEBS and PP.
8. Medalist® MD-575 thermoplastic elastomer—commercially available from Teknor Apex—blend of SEBS and PP.

Table II summarizes the melt flow rate and Shore A hardness of the polymers of Examples 1-8 and the kink resistance and re-kink resistance of tubing samples produced from the polymers of Example 1-8. As shown in Table II, the tubing samples of Examples 1-3 and 5 showed poor kink resistance and, therefore, would not be suitable to replace flexible PVC in medical tubing applications.

Examples 9-27

Unexpectedly, compositions containing dry blends of conjugated diene monovinylarene block copolymers with styrenic thermoplastic elastomers produced acceptable tubing. Table III summarizes the polymers and the dry blends of the polymers of Examples 9-27. The polymers or blends were tested for Shore A hardness, and tubing samples produced from the polymers or blends were tested for kink resistance and re-kink resistance.

Interestingly, the addition of minor amounts of the conjugated diene monovinylarene block copolymers (e.g., 5-35 wt. %) to the styrenic thermoplastic elastomers did not significantly increase the Shore A hardness over that of the pure styrenic thermoplastic elastomers. As compared to the tubing made from the polymer of Example 4, blends with 5-10 wt. % of the polymer of Example 5 did not result in significant increases in kink resistance, while addition levels of 15-35 wt. % resulted in large increases in kink resistance (see Examples 9-16). As compared to the tubing made from the polymer of Example 6, blends with 20 wt. % or less of the polymer of Example 5 resulted in surprisingly improved kink resistance performance, while addition levels of 25-35 wt. % resulted in comparable kink resistance performance (see Examples 17-24). Similarly, unexpected kink resistance improvement also was found when 10-20 wt. % of the polymer of Example 1 was blended with the polymer of Example 6 (see Examples 25-26).

TABLE II

Examples 1-8.

| | Example No. | | | | | | | |
|---|---|---|---|---|---|---|---|---|
| | 1 | 2 | 3 | 4 | 5 | 6 | 7 | 8 |
| Nominal Styrene (wt. %) | 76 | N/T | N/T | 29 | 62 | 25 | N/T | N/T |
| MFR (g/10 min) | 10* | 12.4 | 14.6 | 12* | 6* | 8* | N/T | N/T |
| Kink Resistance (mm) | XX | 54 | 50 | 35 | XX | >35 | 21 | 23 |
| Re-Kink Resistance (mm) | XX | N/T | >50 | 35 | XX | >35 | 24 | 26 |
| Shore A Hardness | 93 | 71 | 59 | 66 | 93 | 58 | 71 | 78 |

Notes:
XX = Too rigid for kink resistance test;
N/T = Not Tested;
*data provided is from a product data sheet.

TABLE III

Examples 9-27.

| Example | Polymer of Example 4 | Polymer of Example 6 | Polymer of Example 5 | Polymer of Example 1 | Kink Resistance (mm) | Re-Kink Resistance (mm) | Shore A Hardness |
|---|---|---|---|---|---|---|---|
| 9 | 100 wt. % | | | | 35 | 35 | 66 |
| 10 | 95 wt. % | | 5 wt. % | | 42 | N/T | 67 |
| 11 | 90 wt. % | | 10 wt. % | | 48 | N/T | 66 |
| 12 | 85 wt. % | | 15 wt. % | | 62 | N/T | 65 |
| 13 | 80 wt. % | | 20 wt. % | | 66 | N/T | 67 |
| 14 | 75 wt. % | | 25 wt. % | | 60 | N/T | 70 |
| 15 | 65 wt. % | | 35 wt. % | | 72 | N/T | 70 |
| 16 | | | 100 wt. % | | XX | N/T | 93 |
| 17 | | 100 wt. % | | | >35 | N/T | 58 |
| 18 | | 90 wt. % | 10 wt. % | | 21 | 22 | 58 |
| 19 | | 85 wt. % | 15 wt. % | | 26 | 26 | 62 |
| 20 | | 80 wt. % | 20 wt. % | | 26 | 30 | 63 |
| 21 | | 75 wt. % | 25 wt. % | | 35 | N/T | 64 |
| 22 | | 70 wt. % | 30 wt. % | | 36 | N/T | 62 |
| 23 | | 65 wt. % | 35 wt. % | | 37 | N/T | 65 |
| 24 | | 55 wt. % | 45 wt. % | | 56 | N/T | 72 |

TABLE III-continued

Examples 9-27.

| Example | Polymer of Example 4 | Polymer of Example 6 | Polymer of Example 5 | Polymer of Example 1 | Kink Resistance (mm) | Re-Kink Resistance (mm) | Shore A Hardness |
|---|---|---|---|---|---|---|---|
| 25 | | 90 wt. % | | 10 wt. % | 27 | 27 | N/T |
| 26 | | 80 wt. % | | 20 wt. % | 27 | 27 | N/T |
| 27 | | | | 100 wt. % | XX | N/T | 93 |

Notes:
XX = Too rigid for kink resistance test;
N/T = Not Tested.

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A polymer composition comprising:
(a) a conjugated diene monovinylarene block copolymer; and
(b) a styrenic thermoplastic elastomer.

Embodiment 2

The composition defined in embodiment 1, wherein a weight ratio of the conjugated diene monovinylarene block copolymer to the styrenic thermoplastic elastomer is in any suitable range or any range of weight ratios disclosed herein, e.g., from about 5:95 to about 95:5, from about 2:98 to about 50:50, from about 5:95 to about 35:65, from about 2:98 to about 25:75, or from about 5:95 to about 25:75.

Embodiment 3

The composition defined in embodiment 1 or 2, wherein the polymer composition comprises any suitable amount of the conjugated diene monovinylarene block copolymer and the styrenic thermoplastic elastomer (in total) or any amount disclosed herein, e.g., at least about 50 wt. %, at least about 75 wt. %, at least about 95 wt. %, in a range from about 60 wt. % to 100 wt. %, or in a range from about 90 wt. % to 100 wt. %.

Embodiment 4

The composition defined in any one of the preceding embodiments, wherein the composition further comprises any suitable additive or any additive disclosed herein, e.g., an antioxidant, an acid scavenger, an antiblock additive, a slip additive, a colorant, a filler, a polymer processing aid, a UV inhibitor, or a lubricant, or any combination thereof.

Embodiment 5

The composition defined in any one of embodiments 1-4, wherein the composition further comprises (c) a third polymer different from (a) and (b), e.g., a polystyrene, a high impact polystyrene, a polybutadiene, or a polyolefin, as well as combinations thereof.

Embodiment 6

The composition defined in any one of embodiments 1-4, wherein the composition is substantially free of any polymer different from (a) and (b), e.g., less than about 5 wt. %, less than about 2 wt. %, less than about 1 wt. %, or 0 wt. %.

Embodiment 7

The composition defined in any one of the preceding embodiments, wherein the composition does not contain a plasticizer.

Embodiment 8

The composition defined in any one of the preceding embodiments, wherein a kink resistance of tubing produced from the composition and tested in accordance with DIN EN 13868 is in any suitable range or in any range disclosed herein, e.g., less than or equal to about 32 mm, less than or equal to about 30 mm, from about 8 mm to about 32 mm, from about 8 to about 28 mm, from about 10 mm to about 28 mm, or from about 9 mm to about 30 mm.

Embodiment 9

The composition defined in any one of the preceding embodiments, wherein a re-kink resistance of tubing produced from the composition and tested in accordance with DIN EN 13868 is in any suitable range or in any range disclosed herein, e.g., less than or equal to about 32 mm, less than or equal to about 30 mm, from about 8 mm to about 32 mm, from about 8 to about 28 mm, from about 10 mm to about 28 mm, or from about 9 mm to about 30 mm.

Embodiment 10

The composition defined in any one of the preceding embodiments, wherein the composition has a Shore A hardness in any suitable range or any range disclosed herein, e.g., from about 20 to about 95, from about 50 to about 75, or from about 55 to about 70.

Embodiment 11

The composition defined in any one of the preceding embodiments, wherein the composition has a melt flow rate (MFR) in any suitable range or any range disclosed herein, e.g., from about 1 to about 30 g/10 min, from about 3 to about 20 g/10 min, or from about 4 to about 18 g/10 min.

Embodiment 12

The composition defined in any one of the preceding embodiments, wherein a weight ratio of the conjugated diene monovinylarene block copolymer to the styrenic thermoplastic elastomer is in a weight ratio range from about 5:95 to about 25:75, or from about 10:90 to about 20:80.

Embodiment 13

The composition defined in any one of the preceding embodiments, wherein the monovinylarene monomer of the conjugated diene monovinylarene block copolymer contains from 8 to 18 carbon atoms.

Embodiment 14

The composition defined in any one of the preceding embodiments, wherein the monovinylarene monomer of the conjugated diene monovinylarene block copolymer is styrene.

Embodiment 15

The composition defined in any one of the preceding embodiments, wherein the conjugated diene monomer of the conjugated diene monovinylarene block copolymer contains from 4 to 12 carbon atoms.

Embodiment 16

The composition defined in any one of the preceding embodiments, wherein the conjugated diene monomer of the conjugated diene monovinylarene block copolymer is a butadiene.

Embodiment 17

The composition defined in any one of the preceding embodiments, wherein the conjugated diene monomer of the conjugated diene monovinylarene block copolymer is 1,3-butadiene.

Embodiment 18

The composition defined in any one of the preceding embodiments, wherein the conjugated diene monovinylarene block copolymer is a styrene butadiene block copolymer.

Embodiment 19

The composition defined in any one of the preceding embodiments, wherein the block copolymer has a Mn in any suitable range or in any range disclosed herein, e.g., from about 5,000 to about 2,000,000 g/mol, or from about 10,000 to about 500,000 g/mol.

Embodiment 20

The composition defined in any one of the preceding embodiments, wherein the block copolymer has a melt flow rate (MFR) in any suitable range or in any range disclosed herein, e.g., from about 1 to about 30 g/10 min, or from about 3 to about 20 g/10 min.

Embodiment 21

The composition defined in any one of the preceding embodiments, wherein the block copolymer contains any suitable amount of the monovinylarene monomer or any amount disclosed herein, e.g., from about 15 to about 95 wt. %, from about 50 to about 80 wt. %, from about 55 to about 85 wt. %, or from about 65 to about 80 wt. %, monovinylarene monomer content, based on the total weight of the block copolymer.

Embodiment 22

The composition defined in any one of the preceding embodiments, wherein the block copolymer contains from about 55 to about 85 wt. %, or from about 60 to about 80 wt. %, monovinylarene monomer content, based on the total weight of the block copolymer.

Embodiment 23

The composition defined in any one of the preceding embodiments, wherein the block copolymer contains any suitable number of blocks or any number of blocks disclosed herein, e.g., from 3 to 10 blocks, or from 4 to 7 blocks.

Embodiment 24

The composition defined in any one of the preceding embodiments, wherein the conjugated diene monovinylarene block copolymer comprises from about 35 phm to about 85 phm monovinylarene monomer, and comprises polymer chains containing a block structure having formula (1):

$$S_1\text{-}(S/B)_1 \tag{1}$$

wherein:

$S_1$ is a monoblock of the monovinylarene monomer, wherein $S_1$ is from about 10 phm to about 45 phm of the copolymer; and $(S/B)_1$ is a mixed block of the conjugated diene monomer and the monovinylarene monomer, wherein the monovinylarene monomer content is from about 20 wt. % to about 80 wt. %, based on the total weight of $(S/B)_1$.

Embodiment 25

The composition defined in embodiment 24, wherein $S_1$ in formula (1) comprises one monoblock or two monoblocks of the monovinylarene monomer.

Embodiment 26

The composition defined in embodiment 24 or 25, wherein $(S/B)_1$ in formula (1) comprises from two to four mixed blocks.

Embodiment 27

The composition defined in any one of embodiments 24-26, wherein the block copolymer comprises from about 55 to about 80 phm monovinylarene monomer.

Embodiment 28

The composition defined in any one of embodiments 1-27, wherein the block copolymer is a coupled block copolymer.

Embodiment 29

The composition defined in any one of embodiments 1-28, wherein the block copolymer is a multimodal block copolymer.

Embodiment 30

The composition defined in any one of embodiments 1-29, wherein the block copolymer is fully hydrogenated.

Embodiment 31

The composition defined in any one of embodiments 1-29, wherein the block copolymer is partially hydrogenated.

Embodiment 32

The composition defined in any one of embodiments 1-31, wherein the block copolymer has at least one tapered mixed block.

Embodiment 33

The composition defined in any one of embodiments 1-31, wherein the block copolymer has at least one random mixed block.

Embodiment 34

The composition defined in any one of the preceding embodiments, wherein the styrenic thermoplastic elastomer contains any suitable amount of styrene or any amount disclosed herein, e.g., from about 10 to about 45 wt. %, from about 15 to about 35 wt. %, or from about 22 to about 32 wt. %, styrene content, based on the total weight of the styrenic thermoplastic elastomer.

Embodiment 35

The composition defined in any one of the preceding embodiments, wherein the styrenic thermoplastic elastomer comprises a styrene-butadiene-styrene block copolymer (SBS copolymer).

Embodiment 36

The composition defined in any one of embodiments 1-35, wherein the styrenic thermoplastic elastomer is fully hydrogenated.

Embodiment 37

The composition defined in any one of embodiments 1-35, wherein the styrenic thermoplastic elastomer is partially hydrogenated.

Embodiment 38

An article comprising the composition defined in any one of embodiments 1-37.

Embodiment 39

An article comprising the composition defined in any one of embodiments 1-37, wherein the article is a film, a medical device or material, or an adhesive.

Embodiment 40

A tubing product comprising the composition, e.g., prepared from the composition, defined in any one of embodiments 1-37.

Embodiment 41

The tubing product defined in embodiment 40, wherein the tubing product has a kink resistance in any suitable range or in any range disclosed herein, e.g., less than or equal to about 32 mm, less than or equal to about 30 mm, from about 8 mm to about 32 mm, from about 8 to about 28 mm, from about 10 mm to about 28 mm, or from about 9 mm to about 30 mm.

We claim:

1. A polymer composition comprising:
(a) a conjugated diene monovinylarene block copolymer having from about 55 to about 85 wt. % monovinylarene monomer content, based on the total weight of the copolymer; and
(b) a styrenic thermoplastic elastomer comprising a styrene-butadiene-styrene block copolymer and having from about 22 to about 27 wt. % styrene content, based on the total weight of the styrenic thermoplastic elastomer;
wherein a weight ratio of the conjugated diene monovinylarene block copolymer to the styrenic thermoplastic elastomer is in a range from about 5:95 to about 20:80; and
a kink resistance of tubing produced from the composition and tested in accordance with DIN EN 13868 is in a range from about 8 to about 32 mm.

2. The composition of claim 1, wherein:
the monovinylarene monomer is styrene; and
the conjugated diene monomer is a butadiene.

3. The composition of claim 1, wherein a total amount of the conjugated diene monovinylarene block copolymer and the styrenic thermoplastic elastomer is at least about 75 wt. % of the composition.

4. The composition of claim 1, wherein the styrenic thermoplastic elastomer has about 25 wt. % styrene content, based on the total weight of the styrenic thermoplastic elastomer.

5. An article comprising the composition of claim 1.

6. A tubing product comprising the composition of claim 1.

7. The composition of claim 1, wherein the conjugated diene monovinylarene block copolymer comprises a styrene butadiene block copolymer.

8. The composition of claim 7, wherein the kink resistance is in a range from about 10 to about 32 mm.

9. The composition of claim 7, wherein the kink resistance is in a range from about 15 to about 32 mm.

10. An article comprising the composition of claim 9.

11. The composition of claim 1, wherein the composition further comprises an additive.

12. The composition of claim 1, wherein the composition further comprises (c) a third polymer that is different from (a) and (b).

13. The composition of claim 1, wherein the composition is substantially free of any polymer different from (a) and (b).

14. The composition of claim 1, wherein the composition has:
   a melt flow rate at 200° C. with a 5 Kg load in a range from about 3 to about 20 g/10 min; and
   a Shore A hardness in a range from about 50 to about 75.

* * * * *